US010542329B2

(12) United States Patent
Adams et al.

(10) Patent No.: US 10,542,329 B2
(45) Date of Patent: Jan. 21, 2020

(54) CABLE JUNCTION DEVICES

(71) Applicant: PPC Broadband, Inc., East Syracuse, NY (US)

(72) Inventors: Cameron James Adams, Camillus, NY (US); André Martineau, Manlius, NY (US); Brian K. Hanson, Cicero, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/985,695

(22) Filed: May 21, 2018

(65) Prior Publication Data

US 2018/0338190 A1 Nov. 22, 2018

Related U.S. Application Data

(60) Provisional application No. 62/509,050, filed on May 19, 2017.

(51) Int. Cl.

*H05K 7/14* (2006.01)
*H05K 7/18* (2006.01)
*H04Q 1/02* (2006.01)
*H04Q 1/14* (2006.01)

(52) U.S. Cl.

CPC ............. *H04Q 1/028* (2013.01); *H04Q 1/142* (2013.01); *H04Q 2201/10* (2013.01); *H04Q 2201/12* (2013.01); *H04Q 2201/16* (2013.01); *H04Q 2201/802* (2013.01)

(58) Field of Classification Search

USPC .......................................................... 361/796
See application file for complete search history.

(56) References Cited

U.S. PATENT DOCUMENTS 5,623,542 A 4/1997 Schneider et al.
5,892,870 A * 4/1999 Fingler ................ G02B 6/3897 385/134
6,045,390 A 4/2000 Metz et al.
6,208,796 B1 * 3/2001 Williams Vigliaturo .................... G02B 6/4453 324/66
7,374,427 B2 * 5/2008 Kodaira ............... H01R 9/0506 439/20
D607,414 S * 1/2010 Egan ............................ D13/151

(Continued)

OTHER PUBLICATIONS

May 21, 2018 Transmittal of International Search Report; Search Report and Written Opinion in International Application No. PCT/US18/33761.

*Primary Examiner* — Hung S. Bui
(74) *Attorney, Agent, or Firm* — Oliff PLC

(57) ABSTRACT

A cable junction device including a housing having a bottom wall, a first forward-facing wall defining a first acute angle relative to the bottom wall, and a second forward-facing wall defining a second acute angle relative to the bottom wall. A single printed circuit board defines a third acute angle relative to the bottom wall. At least one first port extends from the first forward-facing wall toward an exterior of the housing. At least one second port extends from the second forward-facing wall toward the exterior of the housing. The at least one first port and the at least one second port each include a conductive pin configured to be directly electrically connected to the single printed circuit board.

20 Claims, 9 Drawing Sheets

(56) References Cited

U.S. PATENT DOCUMENTS 7,837,397 B2 * 11/2010 Fingler .................. H04L 12/10
385/88
2006/0084286 A1 4/2006 Kooiman
2006/0211303 A1 9/2006 Kodaira et al.
2006/0279379 A1 12/2006 Gale
2015/0130555 A1 * 5/2015 Li ........................ H05K 9/0039
333/100

* cited by examiner 100
112
114
116
102
120
196
196
196
196
118
106
108
190
196
196
196
196
194
104
192

CABLE JUNCTION DEVICES

CROSS-REFERENCE TO RELATED APPLICATION

This nonprovisional application claims the benefit of U.S. Provisional Application No. 62/509,050, filed May 19, 2017. The disclosure of the prior application is hereby incorporated by reference herein in its entirety.

BACKGROUND

The present disclosure relates to cable junction devices and, more particularly, to a coax amplifier splitter or a passive-active terminal adapter.

In conventional coaxial cable amplifiers and/or splitters having multiple ports, the ports typically extend from a single planar surface and are arranged in one or two rows. For example, as shown in FIG. 1, a passive-active terminal adapter may include a plurality of ports extending from a signal planar surface. When the terminal adapter is populated with cables, it may be difficult for a technician to access the ports (i.e., for removing and/or installing connectors). Furthermore, when the terminal adaptor is mounted to a structure, the ports extend outward from the planar surface parallel to and in relatively close proximity to the structure. Such an arrangement makes it even more difficult for a technician to access the ports. However, the arrangement of all ports along a single planar surface allows for connection of a conductive connecting pin of each port to be connected to a single printed circuit board. As would be understood by persons of ordinary skill in the art, each port includes a conductive member that receives a center conductor from a coaxial cable (via a connector) and includes a conductive pin that extends into the housing of the terminal adapter for connection with a printed circuit board, for example, by soldering. Because the conductive pins associated with the ports extend generally parallel to one another, the printed circuit board can extend from one side of the adapter to the opposite side of the adapter in a plane that intersects with all of the conductive pins.

In order to improve access by a technician, some conventional coaxial cable amplifiers and/or splitters include two planar surfaces from which the ports extend. In some apparatuses, the two planar surfaces are parallel to one another, but the ports still extend parallel to a structure to which the apparatus is mounted. Also, the ports that are further from the structure would still extend parallel to and in relatively close proximity to a connecting wall that connects the two planar surfaces. Thus, it may still be relatively difficult for a technician to access all of the ports. Further, because the two planar surfaces are spaced apart from one another by the connecting wall, such an arrangement of ports requires that two printed circuit boards be used, with each printed circuit board extending from one side of the adapter to the opposite side of the adapter in a plane that intersects with all of the conductive pins extending from a respective planar surface. That is, the conductive pins extending inward from the ports on a first one of the planar surfaces would be connected with (e.g., via soldering) a first circuit board, and the conductive pins extending inward from ports on the second one of the planar surfaces would be connected with (e.g., via soldering) the second circuit board. The two circuit boards would then need to be electrically connected via a ribbon cable, coaxial cable, or the like.

It may be desirable to provide a coax amplifier splitter having ports mounted to two mounting walls that are offset from one another and angled relative to a mounting surface in order to provide a technician with better access to the ports. It may be desirable to arrange the mounting walls relative to one another so that the ports can be electrically connected with a single printed circuit board arranged in the coax amplifier splitter housing.

Moreover, some conventional coax amplifier splitters provide a power port adjacent the input and voice modem ports. These conventional arrangements can lead to undesirable signal interference that deteriorates the in house MoCA signal and/or the cable television and/or data signal being transmitted from the input port to the output ports. It may be desirable to provide a coax amplifier splitter having the power port at one side of the splitter and the input and voice modem ports at an opposite side of the splitter.

SUMMARY

According to various aspects of the disclosure, a cable junction device including a housing having a bottom wall, a first forward-facing wall defining a first acute angle relative to the bottom wall, and a second forward-facing wall defining a second acute angle relative to the bottom wall. A single printed circuit board defines a third acute angle relative to the bottom wall. At least one first port extends from the first forward-facing wall toward an exterior of the housing. At least one second port extends from the second forward-facing wall toward the exterior of the housing. The at least one first port and the at least one second port each include a conductive pin configured to be directly electrically connected to the single printed circuit board.

In accordance with some aspects of the disclosure, a cable junction device includes a housing including a bottom wall, a first forward-facing wall defining a first acute angle relative to the bottom wall, and a second forward-facing wall defining a second acute angle relative to the bottom wall. A single printed circuit board defines a third acute angle relative to the bottom wall. A plurality of first ports extends from the first forward-facing wall toward an exterior of the housing. A plurality of second ports extends from the second forward-facing wall toward the exterior of the housing.

In some aspects, each of the plurality of first ports includes a first conductive member configured to extend substantially perpendicular to the first forward-facing wall toward an interior of the housing, and each of the plurality of second ports includes a second conductive member configured to extend substantially perpendicular to the second forward-facing wall toward the interior of the housing.

According to various aspects, the first forward-facing wall is spaced apart from the second forward-facing wall in a direction parallel to the bottom wall.

In some aspects, the printed circuit board is spaced apart from the bottom wall in a direction perpendicular to the bottom wall.

According to some aspects, the first conductive member and the second conductive member each include a conductive pin configured to be directly electrically connected to the single printed circuit board.

In various aspects, at least one boss extends from a top wall of the housing toward the interior of the housing and is configured to have the printed circuit board mounted thereto at the third acute angle.

According to various aspects, each of the plurality of first ports and each of the plurality of second ports includes a female F-type connector configured to receive a coupler of a male F-type connector that terminates a coaxial cable.

In some aspects, each of the plurality of first ports and each of the plurality of second ports is configured to ground the respective male F-type connector.

DETAILED DESCRIPTION OF EMBODIMENTS

Figure 1:
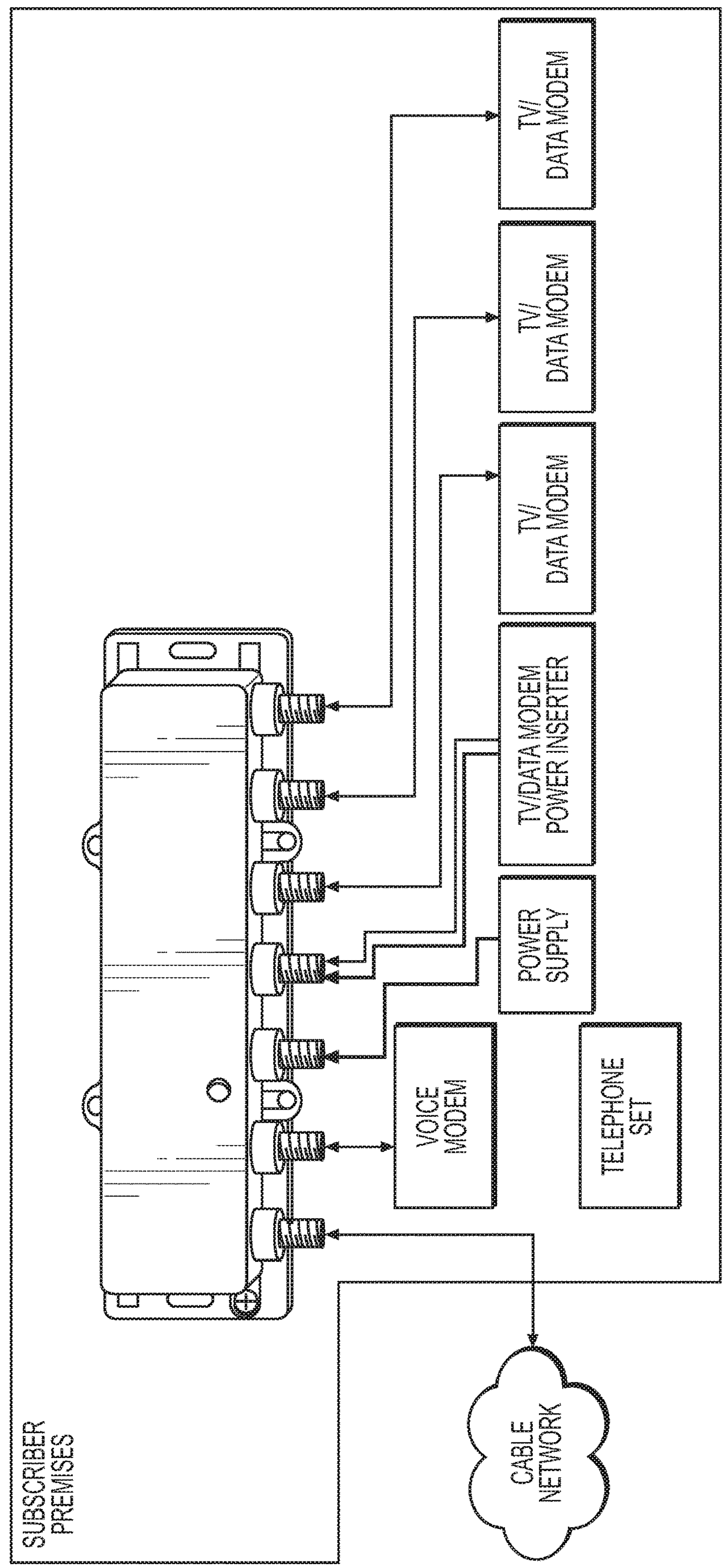
FIG. 1 is a top view of a prior art cable junction device.

As illustrated in FIGS. 2-6, a cable junction device 100 in accordance with various aspects of the disclosure is illustrated. In some aspects, the cable junction device 100 may be a 9-output device such as, for example, a 9-port active return coax amplifier splitter. The cable junction device 100 comprises a housing 102 having a plurality of interface ports 190, 192, 194, 196. For example, port 190 may be a power port, port 192 may be a signal input port (e.g., an RF signal input port), port 194 may be a voice modem port, and eight ports 196 may be RF output ports. The nine outputs include the voice modem port 194 and the eight RF output ports 196.

The housing 102 includes a first forward-facing wall 104 and a second forward-facing wall 106 separated from one another by an intermediate wall 108. The housing 102 further includes a bottom wall 110 and a rearward-facing wall 112. According to some aspects, the rearward-facing wall 112 may include a lower wall portion 114 that extends from the bottom wall 110 at a steep angle relative to the bottom wall and an upper wall portion 116 that extends from the lower wall portion 114 at a smaller angle relative to the bottom wall 110 compared with that of the lower wall portion 114. The housing 102 may include a top wall 118 that connects the second forward-facing wall 106 with the rearward-facing wall 112.

Figure 4:
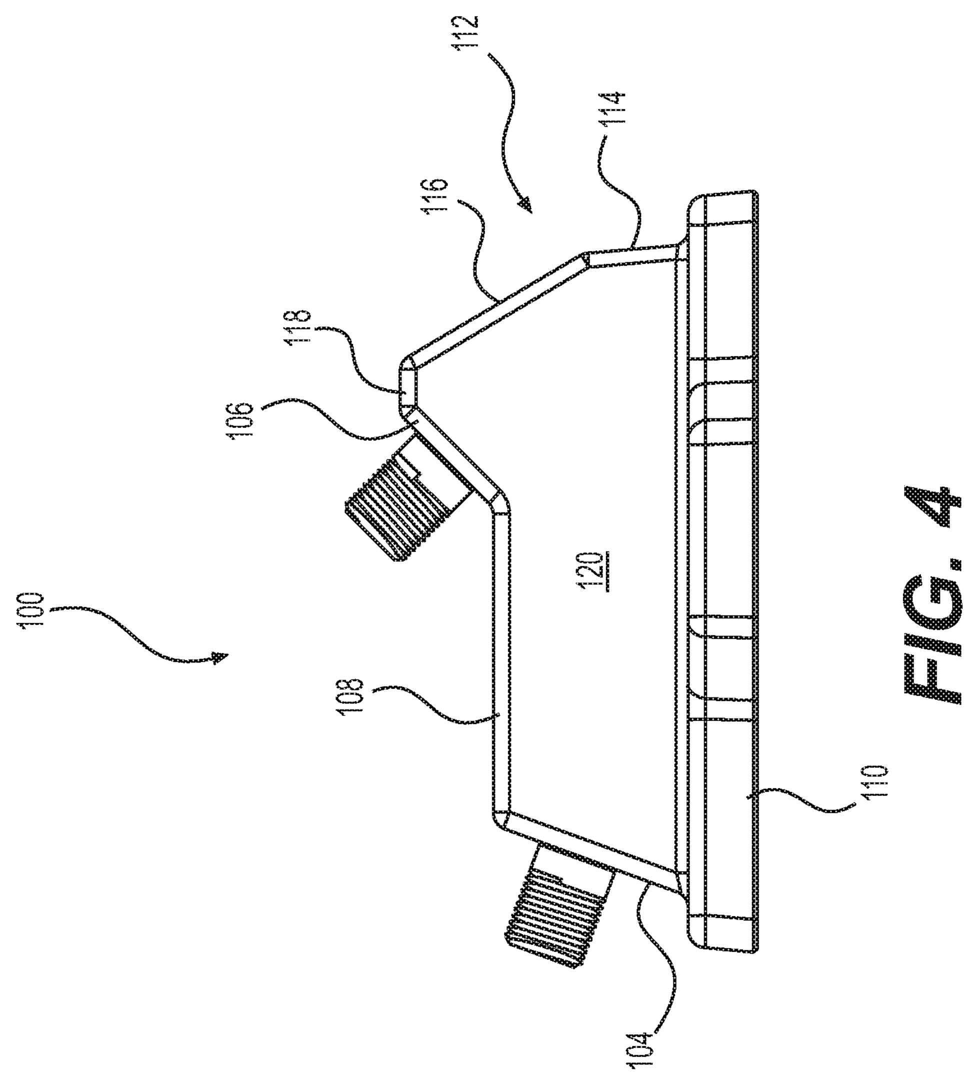
FIG. 4 is a side view of the exemplary cable junction device of FIG. 2.
Figure 5:
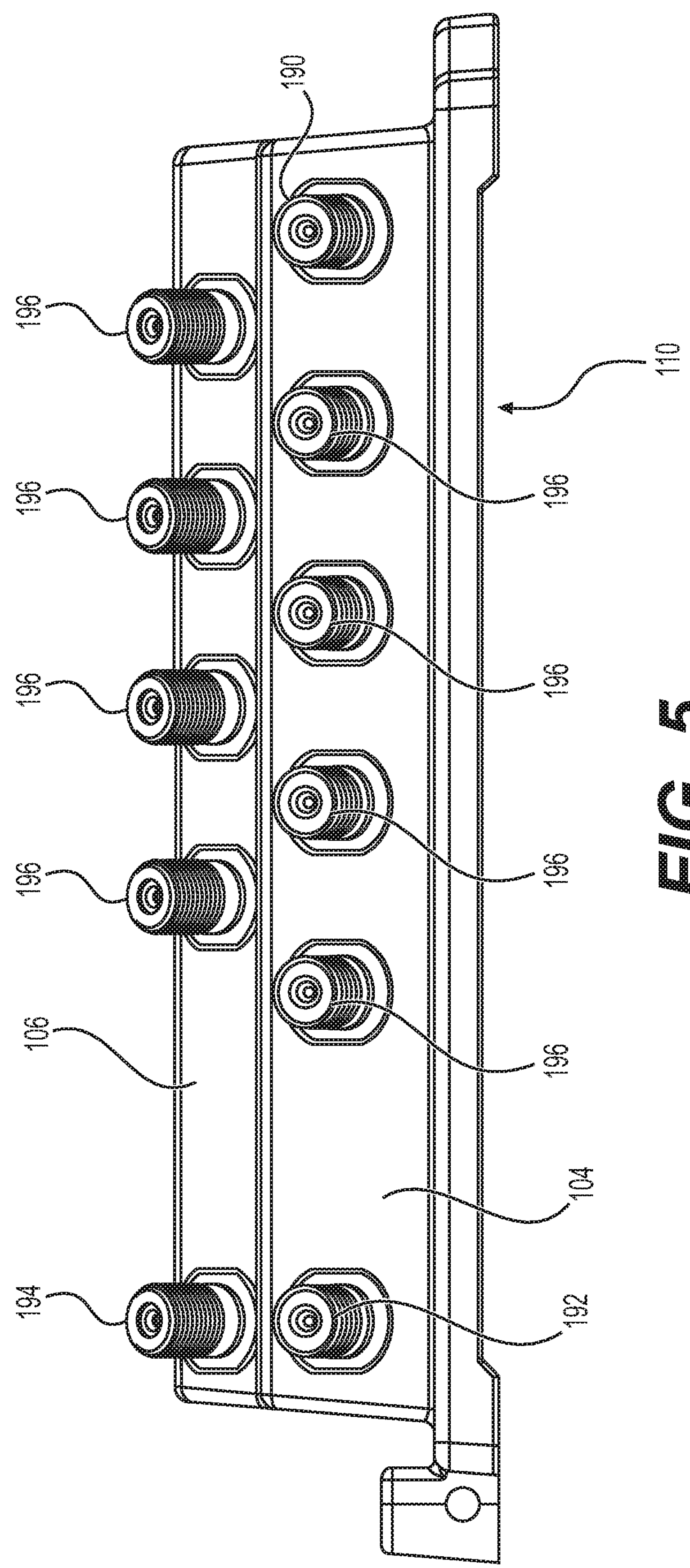
FIG. 5 is a front view of the exemplary cable junction device of FIG. 2.

As best illustrated in FIGS. 4 and 5, the first forward-facing wall 104 and the second forward-facing wall 106 define different angles relative to the bottom wall 110. That is, the first forward-facing wall 104 and the second forward-facing wall 106 are not parallel to one another. As shown, the first forward-facing wall 104 defines a greater angle $\alpha$ relative to the bottom wall 110 than an angle $\beta$ defined by the second forward-facing wall 106 relative to the bottom wall 110.

The housing 102 includes right and left side walls 120, 122 extending upward from the bottom wall 110. The housing 102 may also include mounting structures 124, 126 extending from the right and left side walls 120, 122, respectively. In some aspects, the mounting structures 124, 126 may be a lateral extension of the bottom wall 110. The mounting structures 124, 126 may include a hole 125 or a slot 127 configured to receive a mounting member (not shown), such as a screw, nail, or other fastener, to mount the housing to a structure (not shown). The mounting structures 124, 126 facilitate mounting of the bottom wall 110 to the structure, which may be a wall or a bottom wall of a house box, which in turn may be mounted to a wall.

Figure 2:
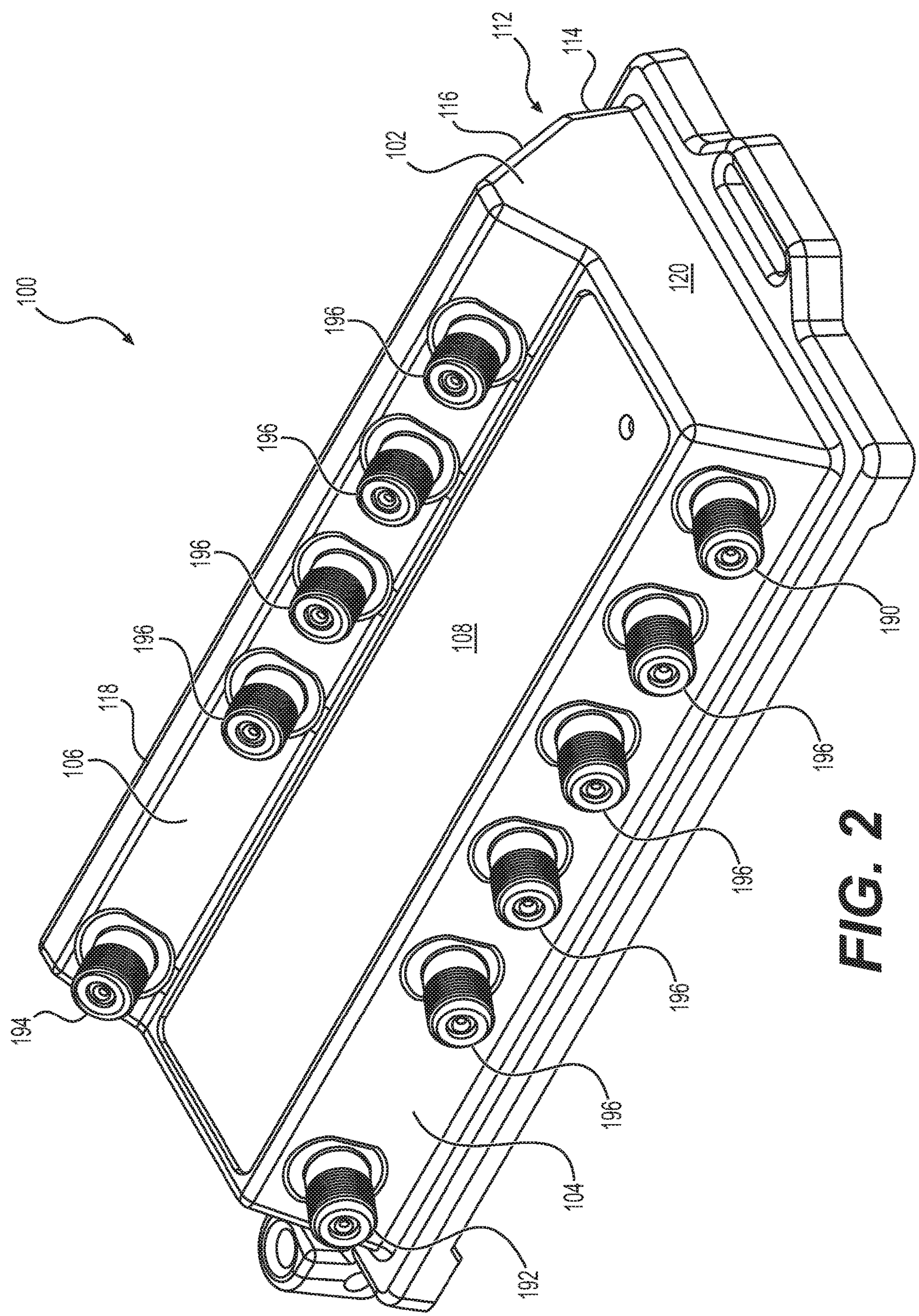
FIG. 2 is a perspective view of an exemplary cable junction device in accordance with various aspects of the disclosure.
Figure 3:
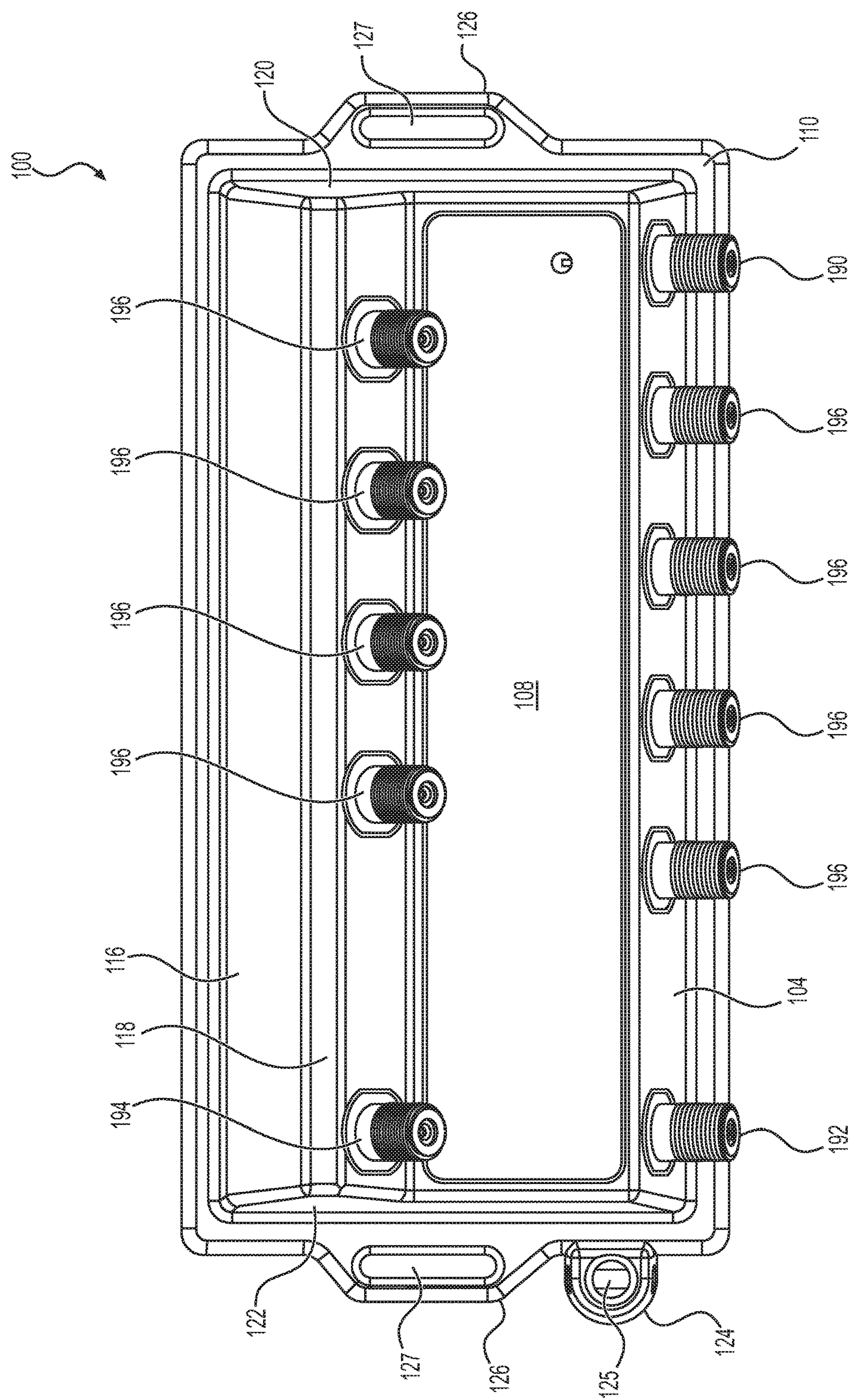
FIG. 3 is a top view of the exemplary cable junction device of FIG. 2.

As best shown in FIGS. 2, 3, and 5, the power port 190, the signal input port 192, and four of the output ports 196 may be mounted to the first forward-facing wall 104, and the voice modem port 194 and the other four output ports 196 may be mounted to the second forward-facing wall 106 in a manner understood by persons skilled in the art. As illustrated in FIG. 3, the signal input port 192 and the voice modem port 194 are at the left-side end of the first forward-facing wall 104 and the second forward-facing wall 106, respectively. The physical separation of the signal input port 192 and the voice modem port 194 may improve the MoCA isolation from the voice modem port 194 to the signal input port 192. The improved isolation may help to prevent an in house MoCA signal from leaking out and may also help to prevent an in house MoCA signal from outside signal interference.

The power port 190 is at the right-side end of the first forward-facing wall 104, as shown in FIG. 3. The power port 190 is thus separated from the signal input port 192 by nearly the entire length of the first forward-facing wall 104 extending from the right side wall 120 to the left side wall 122. The power port 190 is separated from the voice modem port 194 by a length that is a combination of nearly the length of the first forward-facing wall 104 and the distance between the first forward-facing wall 104 and the second forward-facing wall 106. The physical separation of the power port 190 from the signal input port 192 and the voice modem port 194 may provide better isolation from the power port 190 to the signal input port 192 and the voice modem port 194. The improved isolation may help to improve the shield (RFI) performance of the unit. The unit can be more immune to free space signal interference such as radio, cell phone signal, and the like. This leads to a cleaner network and less interruption for television and data signal transmission.

Figure 6:
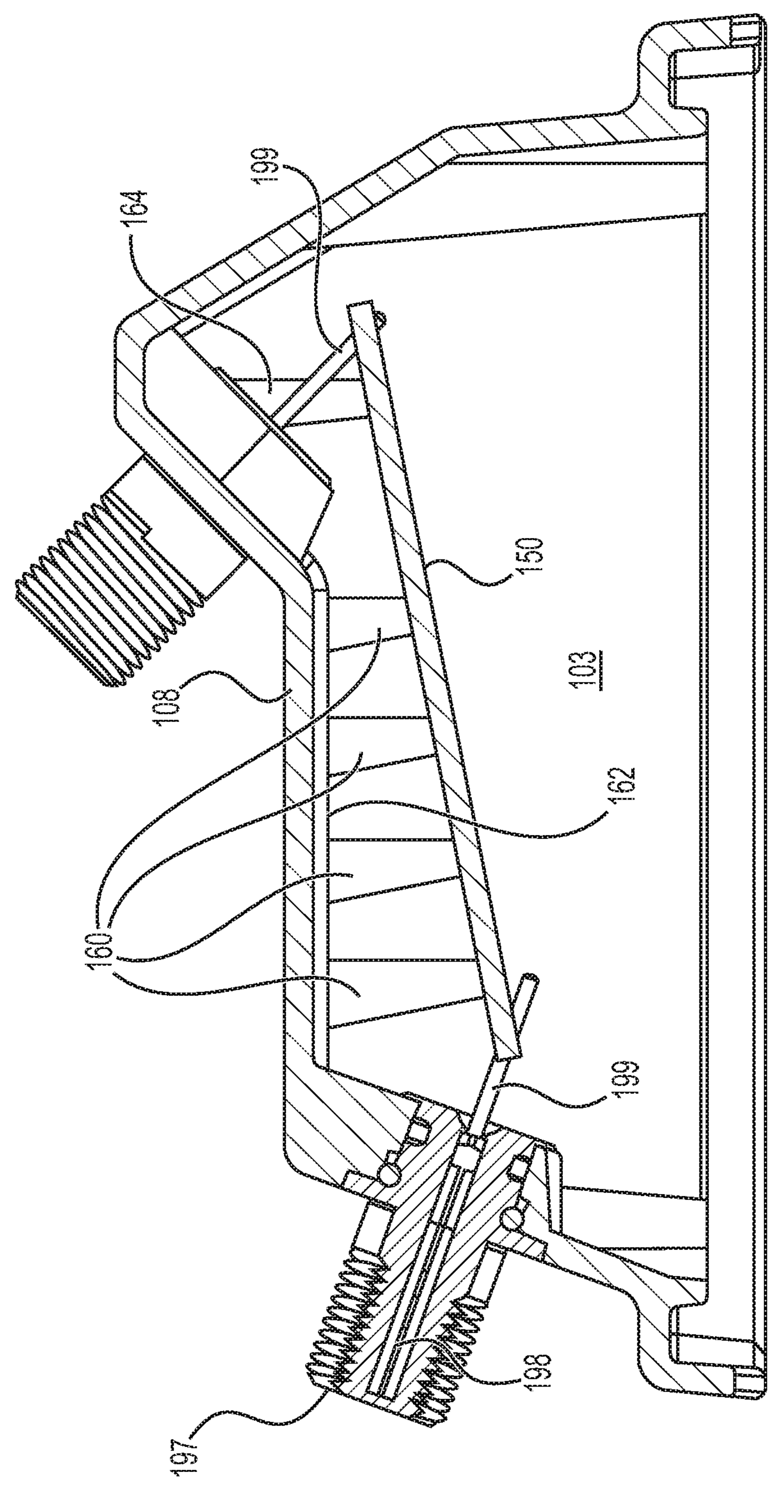
FIG. 6 is a side cross-sectional view of the exemplary cable junction device of FIG. 2.

Referring now to FIG. 6, the differently angled (i.e., non-parallel) first forward-facing wall 104 and second forward-facing wall 106 facilitate the use of a single printed circuit board 150 for connection with all of the ports 190, 192, 194, 196. Each of the ports 190, 192, 194, 196 may include a female F-type connector 197 configured to be coupled with a male F-type connector (not shown). For example, the male F-type connectors may be F-81 connectors, which may include, for example, a threaded coupler configured to be threadedly received by the female F-81 connectors. The female F-type connectors 197 of each port 190, 192, 194, 196 may be mounted to the respective first and second forward-facing walls 104, 106 such that each of the ports is configured to ground an outer conductor of a coaxial cable that is terminated with a male F-type connector to the housing 102. The housing 102 may in turn be electrically connected with a ground contact on the printed circuit board 150.

Each of the female F-type connectors 197 includes a conductive member 198 that receives a center conductor (not shown) from a coaxial cable (via the male F-type connector) and includes a conductive pin 199 that extends into the housing 102 of the cable junction device for direct connection with a printed circuit board 150, for example, by soldering. The conductive pins 199 may extend substantially perpendicular to the respective first and second forward-facing walls 104, 106. The conductive member 198 is shielded from the outer conductor by a dielectric, as would be understood by persons skilled in the art.

Further, the differently angled (i.e., non-parallel) first forward-facing wall 104 and second forward-facing wall 106 permits the printed circuit board 150 to be mounted in the housing 102 at an acute angle γ relative to the bottom wall 110. The acute angle γ that the printed circuit board 150 defines relative to the bottom wall 110 is less than the angle that the first forward-facing wall 104 defines relative to the bottom wall 110 and less than the angle β defined by the second forward-facing wall 106 relative to the bottom wall 110. The printed circuit board 150 may also extend at an acute angle relative to the intermediate wall 108, which results in a space-saving arrangement wherein the printed circuit board 150 is spaced from the bottom wall 110 to allow for better ease of assembly and space for additional components beneath the printed circuit board 150 (i.e., between the printed circuit board 150 and the bottom wall 110. As a result of the arrangement of the first and second forward-facing walls 104, 106 relative to the printed circuit board 150, the conductive pins 199 of each of the ports 192, 194, 196, 198 can be connected to a single printed circuit board 150 having a planar construction that extends from the row of conductive pins 199 extending from the ports of the first forward-facing wall 104 to the row of conductive pins 199 extending from the ports of the second forward-facing wall 106. The planar printed circuit board 150 also extends substantially the distance from the right-side wall 120 to the left-side wall 122.

As illustrated in FIG. 6, the housing 102 may include one or more bosses 160 that extend from an inner surface 162 of, for example, the intermediate wall 108 toward an interior 103 of the housing 102 and/or one or more bosses 164 that extend from an inner surface (not shown) of the second forward-facing wall 106 and/or the top wall 118 toward the interior 103 of the housing 102. As shown, each of the bosses 160, 164 may extend a different distance from a respective inner surface so as to provide mounting surfaces 166 that are arranged to receive the printed circuit board 150 at the angle γ relative to the bottom wall 110. The mounting surfaces 166 may thus be angled relative to the bottom wall 110 by the angle γ. The printed circuit board 150 can be coupled to the bosses 160, for example, by screws or other connectors (not shown), as is understood by persons skilled in the art.

Figure 7:
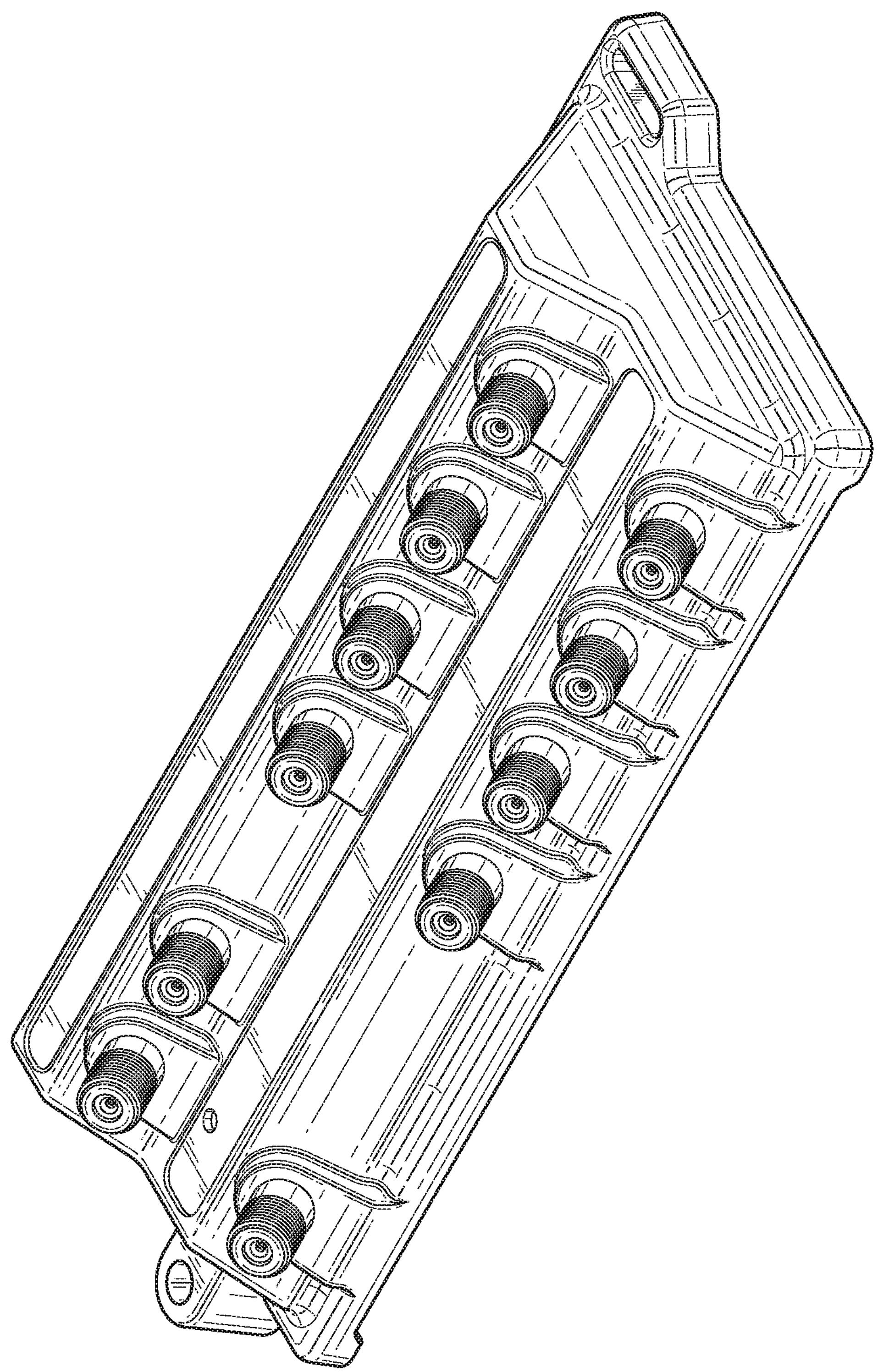
FIG. 7 is a perspective view of another exemplary cable junction device in accordance with various aspects of the disclosure.
Figure 8:
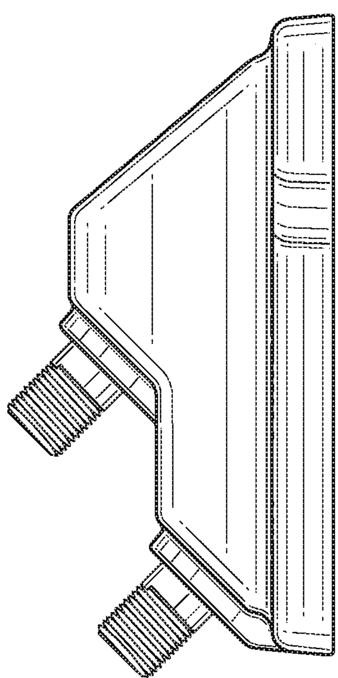
FIG. 8 is a side view of the prior art cable junction device of FIG. 7.

As shown in FIGS. 7 and 8, some coaxial cable amplifiers and/or splitters may include two planar surfaces from which ports extend, wherein the two planar surfaces are parallel to one another, but not to the bottom wall. Thus, the ports are arranged so as to not extend parallel to a structure to which the apparatus is mounted. Such an arrangement may make it easier for a technician to access the ports, but because the two planar surfaces are parallel to one another and spaced apart from one another by the connecting wall, the use of a single printed circuit board may occupy a significant portion of the space in the housing due to the angle at which the printed circuit board would extend relative to the bottom wall.

Figure 9:
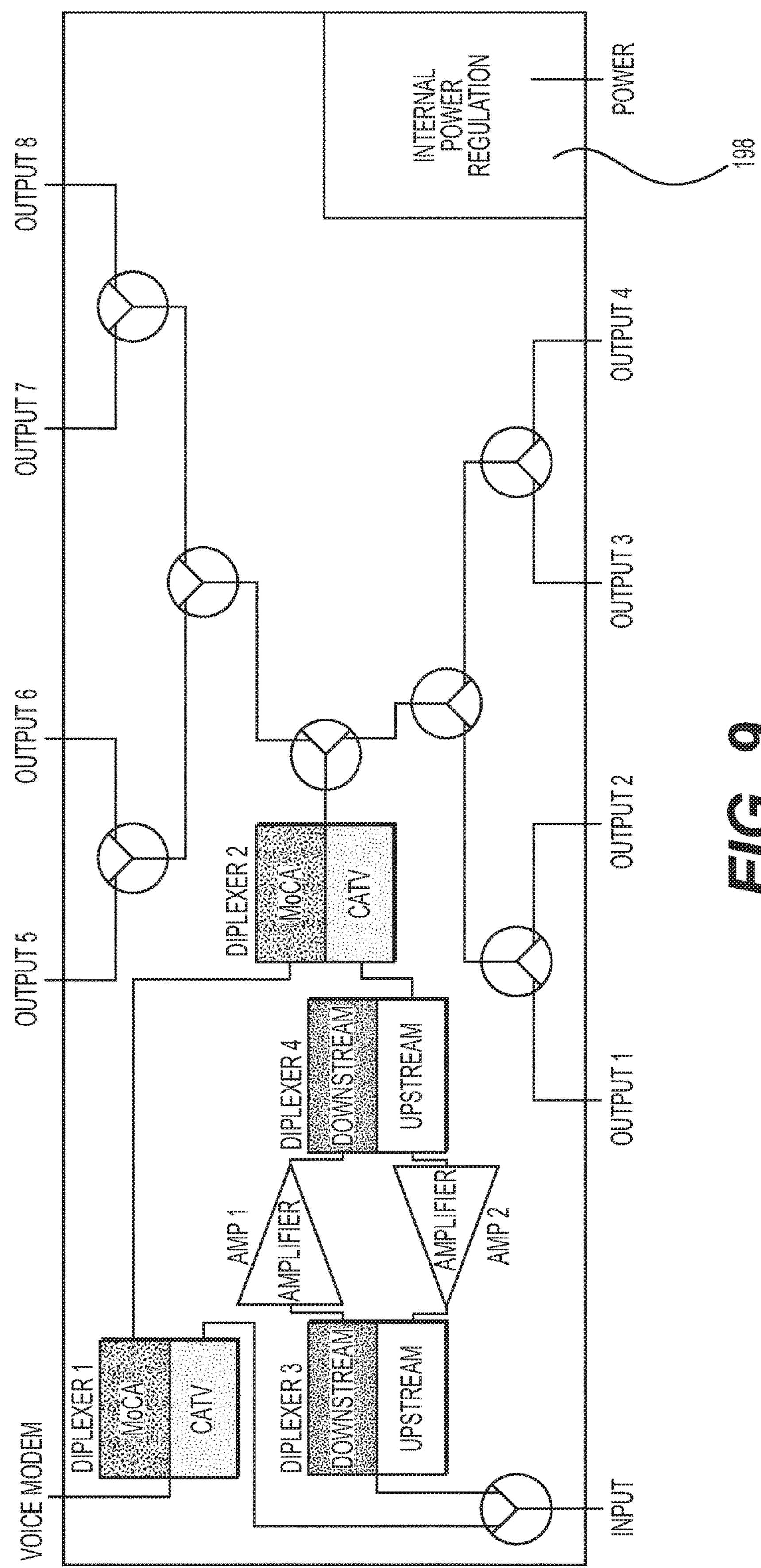
FIG. 9 is a block diagram of an exemplary printed circuit board of the exemplary cable junction device of FIGS. 2 and 7.

Some coax amplifier splitters may be configured as a 9-output device with one all-passive port for voice modems (or eMTAs/HSD) and eight ports with gain for video or high speed data services. Referring now to FIG. 9, a block diagram for the exemplary power circuit board 150 is illustrated.

The all-passive Voice Modem port 194 (−3.5 dB) maintains signal integrity to and from the voice modem/eMTA in the event of a power outage. If the digital voice services are not being implemented, the Voice Modem port can be used for video or data services. A completely passive Voice Modem/eMTA port offers lifeline voice service. Critical communication signals passing to and from the voice modem are never jeopardized by having to pass through active components (e.g. relays) like those found in typical bypass amplifiers. Circuit designs may maintain ANSI/SCTE recommended RF performance on the INPUT and Voice Modem/eMTA ports even when power is lost or there is IC failure.

The signal input port 192 is electrically connected to the output ports 196 via a bi-directional amplifier (Amp 1, Amp 2) and directional couplers/splitters 195. The power input 190 connects with an Internal Power Regulation circuit 198 that takes the power coming from an external power supply thru the power port 190 and filters the noise on the line and regulates the voltage to drive both downstream and upstream amplifiers (Amp 1, Amp 2).

It should be appreciated that in some aspects, the cable junction device 100 may be housed in a house box (not shown) or other container. In other aspects, the cable junction device 100 may be mounted with the bottom wall 110 flush with a flat mounting surface. In conventional devices that have the ports mounted to a flat surface that is perpendicular to a bottom wall, an installer may have difficulty coupling connectors with the ports because insufficient space is provided between the mounting surface or a back panel of the house box. According to the present disclosure, a cable junction device is provided that provides a user with additional space to couple connectors with the ports in view of the angled first forward-facing wall 104 and the angled second forward-facing wall 106.

Further, when the cable junction device 100 is mounted to a structure or to a back panel of a house box, the cables that are to be coupled with the ports of the cable junction device 100 may need to run in a direction that is substantially parallel with the bottom wall 110. The angles α and β of the first forward-facing wall 104 and the second forward-facing wall 106, respectively, permit cables coupled with the ports to extend in a direction substantially parallel with the bottom wall 110 and the mounting surface/back panel without having to be bent at an extreme angle, which could cause deterioration of the signal.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A cable junction device comprising:

a housing including a bottom wall, a first forward-facing wall defining a first acute angle relative to the bottom wall, and a second forward-facing wall defining a second acute angle relative to the bottom wall;

a single planar printed circuit board defining a third acute angle relative to the bottom wall;

a plurality of first ports each including a first connector portion extending from the first forward-facing wall toward an exterior of the housing; and a plurality of second ports each including a second connector portion extending from the second forward-facing wall toward the exterior of the housing, wherein each of the plurality of first ports includes a first conductive portion arranged coaxially with a respective one of the first connector portions and being configured to extend substantially perpendicular to the first forward-facing wall toward an interior of the housing, wherein each of the plurality of second ports includes a second conductive portion arranged coaxially with a respective one of the second connector portions and being configured to extend substantially perpendicular to the second forward-facing wall toward the interior of the housing, wherein the first forward-facing wall is spaced apart from the second forward-facing wall in a direction parallel to the bottom wall, wherein the printed circuit board is spaced apart from the bottom wall in a direction perpendicular to the bottom wall, wherein each of the coaxially-arranged first conductive portions and each of the coaxially arranged second conductive portions is configured to be directly electrically connected to the single printed circuit board, wherein at least one boss extends from a top wall of the housing toward the interior of the housing and is configured to have the printed circuit board mounted thereto at the third acute angle, wherein each of the first connector portions and second connector portions includes a female F-type connector configured to receive a coupler of a male F-type connector that terminates a coaxial cable, and wherein each of the plurality of first ports and each of the plurality of second ports is configured to ground the respective male F-type connector.

2. The cable junction device of claim 1, wherein the first forward-facing wall is nearer to the bottom wall that the second forward-facing wall, and wherein the first acute angle is greater than the second acute angle, and the second acute angle is greater than the third acute angle.

3. A cable junction device comprising:

a housing including a bottom wall, a first forward-facing wall defining a first acute angle relative to the bottom wall, and a second forward-facing wall defining a second acute angle relative to the bottom wall;

a single planar printed circuit board defining a third acute angle relative to the bottom wall;

a first port including a first connector portion extending from the first forward-facing wall toward an exterior of the housing; and a second port including a second connector portion extending from the second forward-facing wall toward the exterior of the housing, wherein the first port includes a first conductive portion arranged coaxially with the first connector portion and being configured to extend substantially perpendicular to the first forward-facing wall toward an interior of the housing, wherein the second port includes a second conductive portion arranged coaxially with the second connector portion and being configured to extend substantially perpendicular to the second forward-facing wall toward the interior of the housing, and wherein the coaxially-arranged first conductive portion and the coaxially-arranged second conductive portion are configured to be directly electrically connected to the single printed circuit board.

4. The cable junction device of claim 3, wherein the first conductive portion and the second conductive portion each include a conductive pin portion configured to be directly electrically connected to the single printed circuit board.

5. The cable junction device of claim 2, wherein the first forward-facing wall is spaced apart from the second forward-facing wall in a direction parallel to the bottom wall.

6. The cable junction device of claim 3, wherein the printed circuit board is spaced apart from the bottom wall in a direction perpendicular to the bottom wall.

7. The cable junction device of claim 3, wherein at least one boss extends from a top wall of the housing toward the interior of the housing and is configured to have the printed circuit board mounted thereto at the third acute angle.

8. The cable junction device of claim 3, wherein each of the first port and the second port includes a female F-type connector configured to receive a coupler of a male F-type connector that terminates a coaxial cable.

9. The cable junction device of claim 3, wherein each of the first port and the second port is configured to ground the respective male F-type connector.

10. The cable junction device of claim 3, wherein the first forward-facing wall is nearer to the bottom wall that the second forward-facing wall, and wherein the first acute angle is greater than the second acute angle, and the second acute angle is greater than the third acute angle.

11. A cable junction device comprising:

a housing including a bottom wall, a first forward-facing wall defining a first acute angle relative to the bottom wall, and a second forward-facing wall defining a second acute angle relative to the bottom wall; and a single planar printed circuit board defining a third acute angle relative to the bottom wall, wherein the first forward-facing wall includes a first connector portion and a first conductive portion, and the second forward-facing wall includes a second connector portion and a second conductive portion, wherein the first conductive portion is arranged coaxially with the first connector portion and is configured to extend substantially perpendicular to the first forward-facing wall toward an interior of the housing, wherein the second conductive portion is arranged coaxially with the second connector portion and is configured to extend substantially perpendicular to the second forward-facing wall toward the interior of the housing, and wherein the coaxially-arranged first conductive portion and the coaxially-arranged second conductive portion are configured to be directly electrically connected to the single printed circuit board.

12. The cable junction device of claim 11, wherein the first conductive portion and the second conductive portion each include a conductive pin portion configured to be directly electrically connected to the single printed circuit board.

13. The cable junction device of claim 12, wherein the conductive pins are electrically connected to the single printed circuit board by solder.

14. The cable junction device of claim 11, wherein the first forward-facing wall is spaced apart from the second forward-facing wall in a direction parallel to the bottom wall.

15. The cable junction device of claim 11, wherein the printed circuit board is spaced apart from the bottom wall in a direction perpendicular to the bottom wall.

16. The cable junction device of claim 11, wherein at least one boss extends from a top wall of the housing toward the interior of the housing and is configured to have the printed circuit board mounted thereto at the third acute angle.

17. The cable junction device of claim 11, wherein the first forward-facing wall includes a plurality of first ports, each of the first ports including one of the first connector portion and the first conductive portion, and wherein the second forward-facing wall includes a plurality of second ports, each of the second ports including one of the second connector portion and the second conductive portion.

18. The cable junction device of claim 17, wherein each of the plurality of first ports and each of the plurality of second ports includes a female F-type connector configured to receive a coupler of a male F-type connector that terminates a coaxial cable.

19. The cable junction device of claim 17, wherein each of the plurality of first ports and each of the plurality of second ports is configured to ground the respective male F-type connector.

20. The cable junction device of claim 11, wherein the first forward-facing wall is nearer to the bottom wall that the second forward-facing wall, and wherein the first acute angle is greater than the second acute angle, and the second acute angle is greater than the third acute angle.

* * * * *